Sept. 17, 1968     C. G. STOUFFER ET AL     3,401,558
INERTIA COMPENSATED BALANCE SYSTEM
Filed March 21, 1966
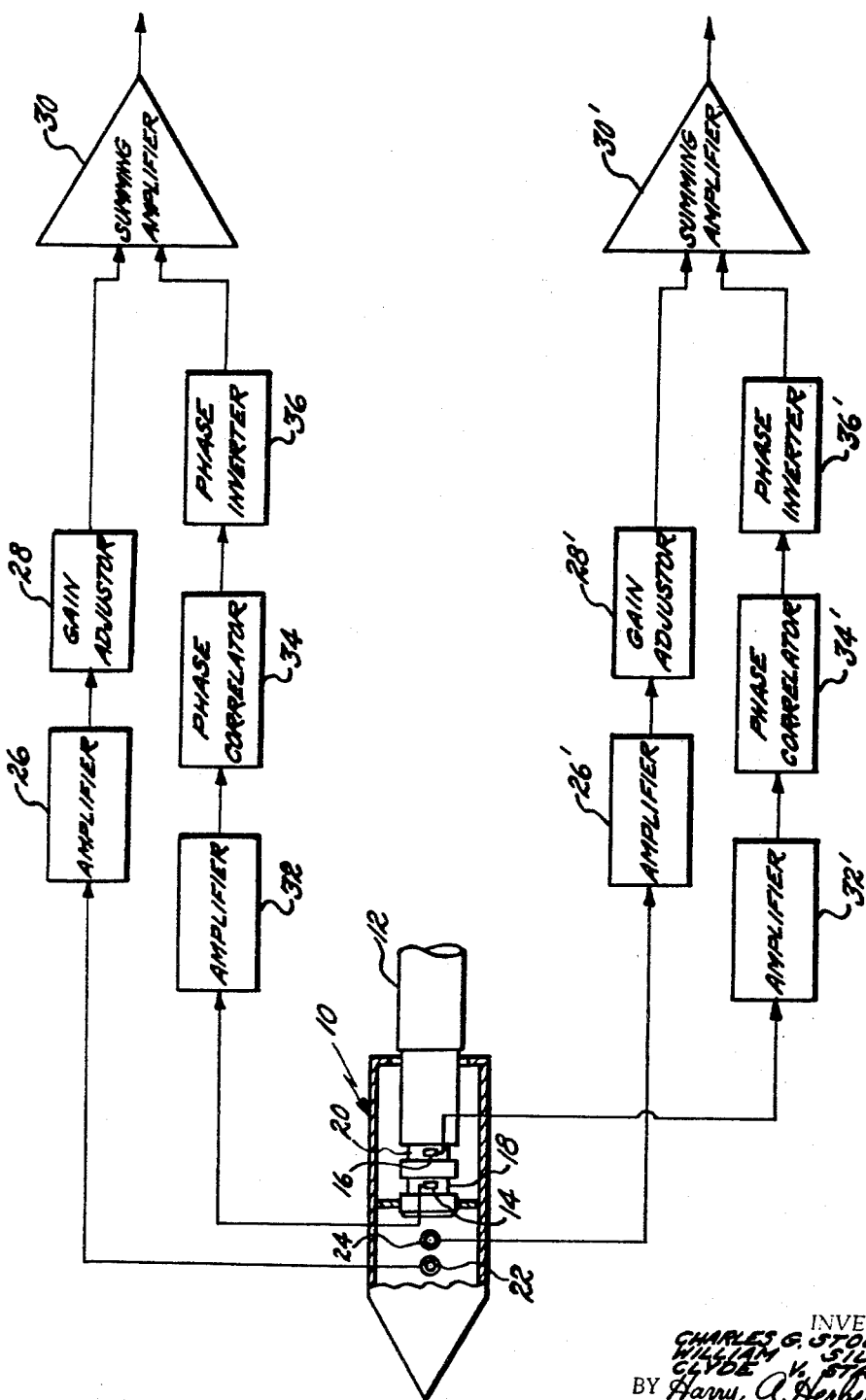

United States Patent Office 3,401,558
Patented Sept. 17, 1968

3,401,558
INERTIA COMPENSATED BALANCE SYSTEM
Charles G. Stouffer, Baltimore, William Silver, Bel Air, and Clyde V. Stahle, Jr., Timonium, Md., assignors to the United States of America as represented by the Secretary of the Air Force
Filed Mar. 21, 1966, Ser. No. 537,620
1 Claim. (Cl. 73—147)

ABSTRACT OF THE DISCLOSURE

A dynamic balance system for the measurement of ingrated transonic buffet loads on wind tunnel models wherein signals from a standard moment balance are combined with the signals from accelerometers, located where the inertia loads measured by the balance can be canceled by the accelerometers with proper gain adjustments and thereby measuring only the total random oscillatory aerodynamic loads resulting from local surface pressure fluctuations.

---

This invention relates generally to a dynamic balance system for measuring the integrated moment signal due to aerodynamic buffet, and more specifically to a system which corrects for the inertia effects of a model by summing the signals from a standard moment balance with the signals from strategically located accelerometers.

The measurement of buffet loads on aerodynamic shapes resulting from oscillating shock waves and flow separation, occurring principally during transonic flight, is difficult. In the past, during wind tunnel tests, pressure transducers have been utilized. For local buffet loads, a number of pressure transducers located at the points of interest may prove sufficient. If integrated buffet loads are desired, however, the number of pressure transducers required can be excessive and the subsequent data analysis laborious. While the number of pressure transducers to acquire integrated buffet loads on symmetrical shapes may be tolerable, unsymmetrical shapes would require an excessive number of transducers.

The dynamic motion of a model produces inertia loads which are superimposed on the external loads sensed by the moment balance. In testing a model only the external load is of interest and the inertial load must be removed or compensated for in the balance output.

Previous systems have been developed to cancel impulse shock loads in hypersonic shock tunnels. Such systems, however, can only be used to cancel impulse shock loads with a model support system of relatively high resonant frequency.

The system herein described corrects the inertia effects of a model and its tunnel support system and measures only the total random oscillatory aerodynamic loads resulting from local surface pressure fluctuations.

It is therefore an object of this invention to provide a new and improved system for measuring the buffet loads on aerodynamic shapes.

It is another object of this invention to provide a new and improved system for measuring transonic buffet loads where the force is continuous and random in nature.

It is a further object of this invention to provide a new and improved system for measuring transonic buffet loads where the resonant frequency of the system will be low.

It is still another object of this invention to provide a new and improved system for measuring buffet loads on aerodynamic shapes with a minimum number of sensing devices.

It is still a further object of this invention to provide a new and improved balance measuring system which requires a minimum amount of data analysis.

These and other advantages, features and objects of the invention will become more apparent from the following description taken in connection with the illustrative embodiment in the accompanying drawing wherein:

The figure is a block diagram of the system embodied in this invention.

Referring now to the drawing, the model 10 is supported from the rear by a sting 12 which is in turn supported from a vertical strut downstream of the test section (not shown). Two portions of the strut can be moved equally or differentially to change model elevation or angle of attack. The model is designed to permit variation of the accelerometer location so that it can be located at a specific point where the inertia loads measured by the balance can be canceled by the accelerometers with proper gain adjustments.

A standard moment balance is provided with two flexures 18 and 20 where strain gauges 14 and 16 are positioned. The strain gauges are in the form of a balance bridge circuit, and located to measure the stress level and a normal force applied at the assumed center of pressure of the model. Two accelerometers 22 and 24 are mounted at strategic positions on the model and may be of a piezoelectric type to simplify their wiring to test instruments. The exact position of the accelerometer with reference to the strain gauge must be determined experimentally. Generally, this is done by placing the accelerometer at an arbitrary position on the model; exciting the system at the first mode frequency from a position on the sting and adjusting the amplitude of the strain gauge and accelerometer outputs until they are equal. The system is then excited at the second mode frequency and without changing the gain settings, the amplitudes of the strain gauge and accelerometer outputs were recorded. The same method is followed for the third mode frequency.

By forming a ratio of strain gauge output amplitude to accelerometer output amplitude for each mode frequency and plotting this ratio against the accelerometer position, a determination of accelerometer location is obtained.

In operation the signal generated by the accelerometer 22 is amplified by amplifier 26, and calibrated by means of the gain adjustor 28. The signal is then sent to the summing amplifier 30.

The signal generated by the bridge circuit of the standard moment balance 20 is amplified, 32, and phase corrected at 34 to insure proper phasing with the accelerometer signal, and then phase inverted at 36 to provide a signal proper for integration in the summing amplifier 30 with the accelerometer signal.

Other accelerometer systems would function in the same manner as the one herein described as, for example, accelerometer 24 would utilize components 26′, 28′ and 30′, while the moment balance 18 functions with components 32′, 34′ and 36″ as well as 30′. The output of the summing amplifiers is the integrated moment signal due to aerodynamic buffet.

All systems are then calibrated to determine the precise accelerometer location, proper signal conditioning and the dynamic sensitivity. The accuracy of the system may be checked by the measurement and comparison of a random excitation with a calibrated random input force.

While this invention is described with two measuring systems it is in no way limited thereto.

Although the invention has been described with reference to a particular embodiment, it will be understood to those skilled in the art that the invention is capable of a variety of alternative embodiments within the spirit and scope of the appended claim.

We claim:
1. A method of measuring total random oscillatory aerodynamic loads on scaled wind tunnel models comprising the steps of: mounting a model in a wind tunnel; positioning a balance strain gauge on a flexure of the model mounting means; connecting the gauge to a circuit comprising in series an amplifier, a phase corrector, a phase inverter and a summing amplifier; positioning an accelerometer on the model and connecting it to a circuit comprising in series an amplifier, a gain adjustment and said summing amplifier, the accelerometer being positioned at a specific point whereby the inertia loads measured by the balance strain gauge are able to be canceled by the said gain adjustment; testing the model and measuring the output of the summing amplifier as the total random aerodynamic load.

References Cited
UNITED STATES PATENTS

| | | | |
|---|---|---|---|
| 2,885,891 | 5/1959 | Wilson et al. | 73—147 |
| 2,935,870 | 5/1960 | Lyons | 73—147 |
| 3,258,959 | 7/1966 | Deegan | 73—117.4 |

S. CLEMENT SWISHER, *Primary Examiner.*

NEIL B. SIEGEL, *Assistant Examiner.*